United States Patent [19]
McKillip

[11] Patent Number: 5,272,601
[45] Date of Patent: Dec. 21, 1993

[54] BACKLIGHTING FOR LIQUID CRYSTAL DISPLAYS

[75] Inventor: Robert C. McKillip, Cedar Rapids, Iowa

[73] Assignee: Rockwell International Corporation, Seal Beach, Calif.

[21] Appl. No.: 755,888

[22] Filed: Sep. 6, 1991

[51] Int. Cl.$^5$ .................................. G01D 11/28
[52] U.S. Cl. ..................... 362/27; 362/30; 362/298; 362/331
[58] Field of Search ............ 362/23, 26, 29, 30, 362/31, 326, 328, 329, 330, 298, 300, 331, 333, 294; 359/49

[56] References Cited

U.S. PATENT DOCUMENTS

| | | | |
|---|---|---|---|
| 2,259,910 | 10/1941 | Rylsky | 362/26 |
| 3,234,376 | 2/1966 | Ceglia | 362/333 |
| 3,881,809 | 5/1975 | Fergason et al. | 362/26 |
| 4,322,780 | 3/1982 | Murakami et al. | 362/31 |
| 4,616,296 | 10/1986 | Westgaard et al. | 362/300 |
| 4,674,211 | 6/1987 | Pratt | 40/152.2 |
| 4,772,986 | 9/1988 | McNemor | 362/23 |
| 4,791,540 | 12/1988 | Dreyer, Jr. et al. | 362/31 |
| 4,887,189 | 12/1989 | Garrett | 362/27 |
| 4,994,941 | 2/1991 | Wen | 362/330 |
| 5,046,826 | 9/1991 | Iwamoto et al. | 362/31 |

OTHER PUBLICATIONS

3M/Optical Systems, T.I.R. Film (SOLF), Design Aid. Gilmore, V. Elaine, Piping Light, Popular Science 1988.

3M/Scotchlamp Film application note and specifications, 3M, St. Paul, Minn.

Primary Examiner—Richard R. Cole
Assistant Examiner—Y. Quach
Attorney, Agent, or Firm—M. Lee Murrah; V. Lawrence Sewell; H. Fredrick Hamann

[57] ABSTRACT

Improved backlighting of liquid crystal and other flat panel displays is accomplished by lighting the back of the LCD using lamps located at the ends of the LCD. The LCD is mounted over a channelized frame, and a light transmissive window covers each end of the channel, the combination forming a sealed LCD unit. The LCD unit is mounted in a panel which has reflectively-coated recesses on each side of the LCD unit containing incandescent lamps and opening in registry with the windows in the LCD. The windows are constructed of two back-to-back sheets of prism film whose function is to reject light impinging at greater than the critical angle of the film. The light from the lamps is thereby better distributed along the full width of the LCD, which eliminates bright and dark spots on the LCD. The LCD channel is provided with a centrally-located, raised luminaire to further diffuse light from the lamps in the center of the LCD. Placement of the lamps outside the LCD unit permits defective lamps to be replaced without opening the LCD unit which is normally sealed for environmental reasons. Provision of openings into the lamp recesses permits lamps to be replaced from the front panel without removing the electronics equipment of which the LCD is a part.

7 Claims, 2 Drawing Sheets

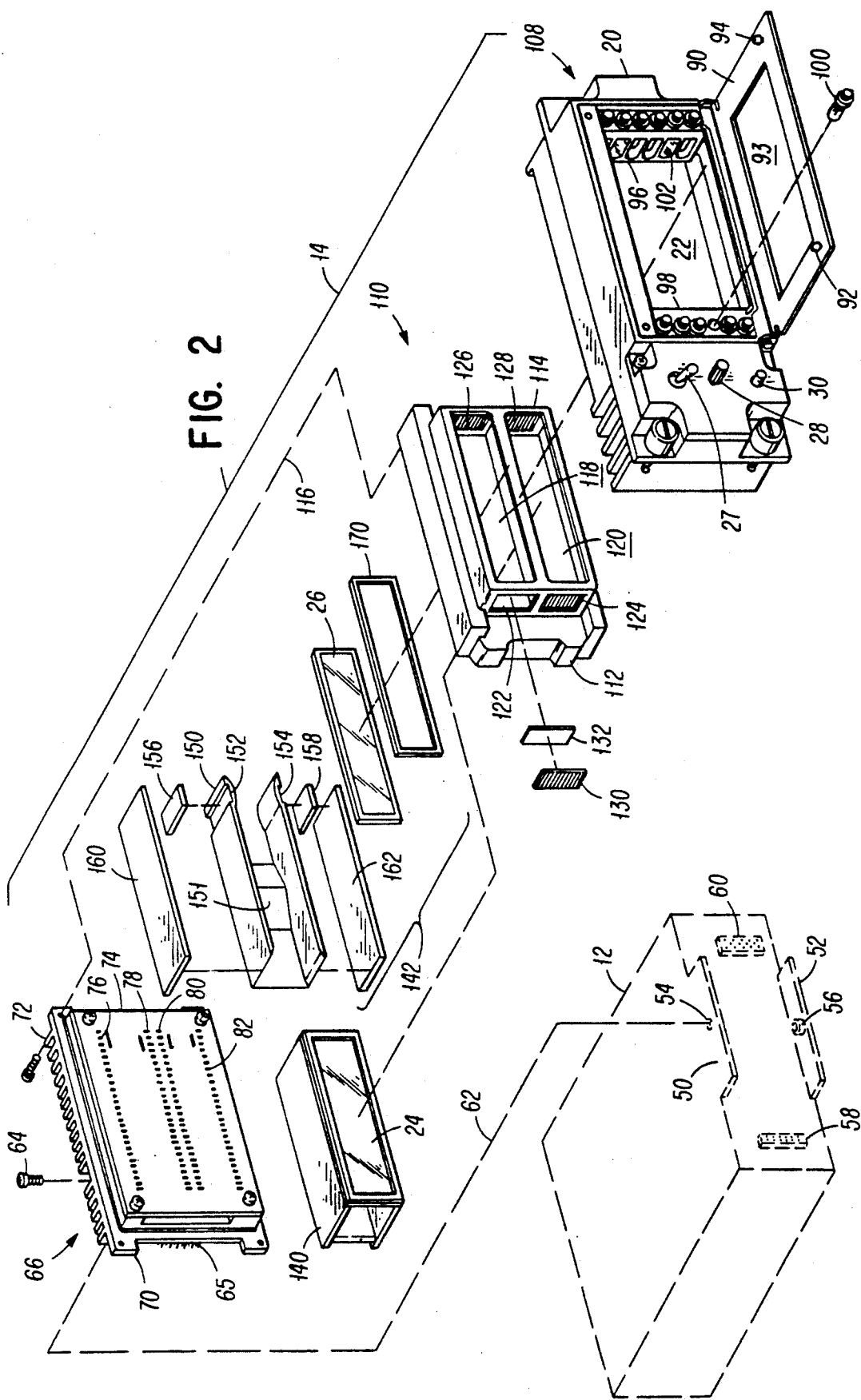

BACKLIGHTING FOR LIQUID CRYSTAL DISPLAYS

This invention was made with Government support under Contract No. DAAJ09-88-C-A043 awarded by U.S. Army Aviation Systems Command. The Government has certain rights in this invention.

BACKGROUND OF THE INVENTION

The invention relates to displays, and more particularly to flat panel displays, and most particularly to backlighting for such flat panel displays.

Liquid crystal displays (LCD's) are widely used in applications where space is a limiting factor. One such application that is becoming increasingly common is aircraft cockpit displays for avionics equipment. The principle of operation of LCD's is well known in the art; but for purposes of understanding the background of the present invention, it can be stated that LCD's operate by reducing the transmissibility of light through a thin layer of a liquid crystalline material when an electric field is applied. Since the effect is localized, shapes and characters can be drawn on an LCD by carefully controlling the application of the electric field. Unlike cathode ray tubes which LCD's are replacing, LCD's are not self-illuminating. This does not normally affect daylight use, but under night or other low light level conditions some sort of backlighting is required in order for LCD's to be viewed. Very high brightness ambients also require additional backlight brightness to maintain readability.

Backlighting is conventionally accomplished by locating an electroluminescent device in a sealed cavity directly behind the LCD. The cavity must normally be sealed because LCD's are subject to environmental degradation if exposed to humidity. However, it has been found for some applications that electroluminescent devices do not provide sufficient light. Incandescent lamps could be used, but such lamps are prone to failure and must be replaced. Since LCD's are sealed, incandescent lamps located in the sealed cavity behind the LCD would not be easily accessible. Displays of various kinds have been lighted from the sides, but the light rays from such sources are not equally distributed, leading to bright spots on the edges of the display and dark areas in the center.

It is therefore an object of the present invention to provide a backlighted flat panel display for an electronics device which uniformly distributes the light across the display and eliminates bright and dark spots.

It is another object of the present invention to provide a backlighted flat panel display for an electronics device whose light sources may be replaced without opening the sealed displays.

It is a further object of the present invention to provide a backlighted flat panel display for an electronics device whose light sources may be replaced without removing the electronics from its mounting.

Still other objects will become apparent to the following summary and description of a preferred embodiment of the invention.

SUMMARY OF THE INVENTION

A sealed flat panel display is provided with improved backlighting using lamps that may be replaced without opening the sealed display unit. The sealed display unit comprises a reflectively coated, channelized frame having the top of the channel covered by the flat panel and the ends covered by a light transmissive window. The sealed display unit is positioned in a mating panel which has reflectively coated recesses in registry with the window and containing light sources for providing illumination through the window. A raised luminaire may be located in the channel to direct light upwardly onto the rear of the flat panel. The recesses may also open to the front of the mating panel to permit replacement of the lamps.

BRIEF DESCRIPTION OF THE DRAWINGS

The invention may be more fully understood by reading the following description of a preferred embodiment of the invention in conjunction with the appended drawings wherein:

FIG. 2 is an exploded perspective of the avionics equipment of FIG. 1;

DETAILED DESCRIPTION OF A PREFERRED EMBODIMENT

Figure 1:
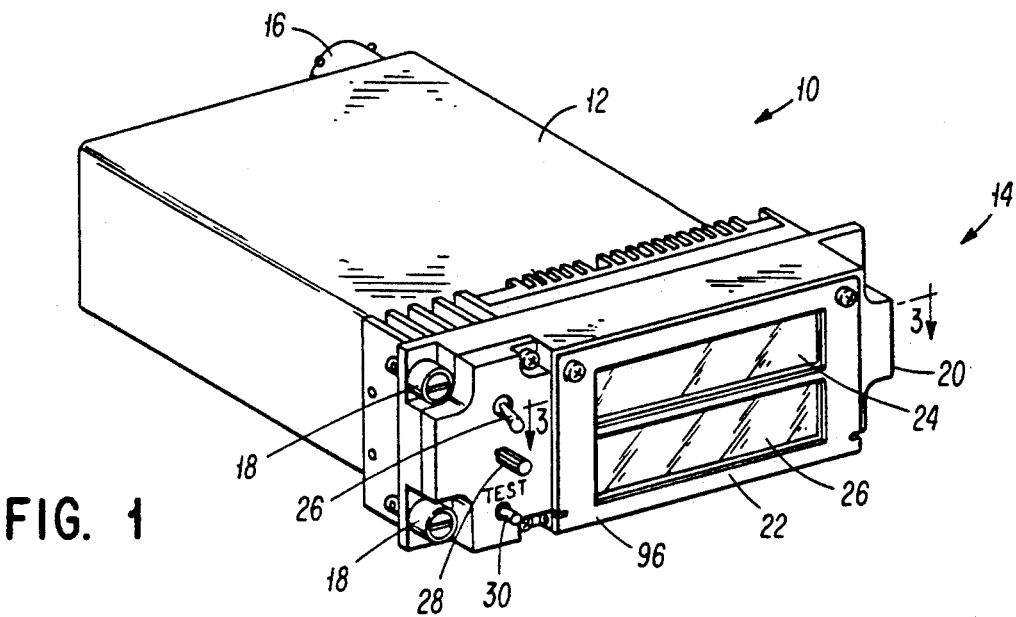
FIG. 1 is a perspective view of a piece of avionics equipment that would typically utilize a liquid crystal or other flat panel display in accordance with the present invention.

Referring first to FIG. 1, the present invention may be used in a unit of avionics equipment 10 comprising an electronics section in an enclosed box 12 and a display section 14 attached to the front of box 12 by appropriate fasteners and electrically coupled by means of a multi-conductor plug (not shown). The entire unit 10 may be coupled to sensors or other electronics systems by means of a multi-conductor connector 16 on the rear of box 12. Unit 10 may be inserted in a cutout in an aircraft instrument panel and secured by quick-connect connectors 18 and two other connectors on the opposite side of display section which are obscured in the view shown.

Display section 14 comprises generally a frame 20 with a cutout 22 opening into a pair of liquid crystal or other flat panel displays (LCD's) 24 and 26. Laterally of cutout 22, frame 20 may have disposed therein controls such as switch 27, rotary control 28 and pushbutton 30. These controls may be used to select and control various functions of avionics equipment 10, including the information that is displayed on LCD's 24 and 26.

Referring next to FIG. 2, electronics section box 12 shown in dotted outline has a pair of flanges 50 and 52 having holes 54 and 56 therein, each of which may be threaded or have an integral nut associated therewith. Box 12 also may have a pair of multi-conductor connectors 58 and 60. Box 12 connects mechanically and electrically to display section 14 comprising all the components in exploded view located above and to the right of box 12. As indicated by phantom line 62, flanges 54 and 56 connect to the rear of display section 14 by means of screw 64 and another screw (or other suitable connectors) not visible in FIG. 2, respectively. Electrical connection of connectors 58 and 60 to display section 14 is made by means of mating multi-conductor electrical connectors 65 and another connector not visible in FIG. 2.

Display section 14 comprises a rear assembly 66, a front assembly 68 and an LCD assembly comprising generally all the components located intermediate display rear assembly 66 and display front assembly 68. Display rear assembly 68 comprises in general a back panel 70 having a multiplicity of heat dissipative fins 72 on the back side thereof. On the other side of back panel 70 may be mounted by screws or other suitable means a printed wiring board 74 on which may be mounted suitable electronics for driving LCD's 24 and 26. Printed wiring board 74 may have linear rows of contacts 76, 78, 80, and 82 for electrical connection to LCD's 24 and 26 in the manner to be hereinafter described.

Front assembly 68 of display section 14 comprises the aforementioned frame 20 having cutout 22 therein. Over cutout 22 is positioned a hinged door 90 which may be secured in closed position by means of expansion screws 92 and 94 or other suitable connectors. Hinged door 90 has a rectangular cutout 93 sized to permit a full view of LCD's 24 and 26. Along each side of cutout 22 in frame 20 is a multiplicity of cavities 96 and 98 (not visible in FIG. 2). Each of cavities 96 and 98 contains an incandescent lamp, one of which 100 is shown prior to insertion into one of cavities 98. Incandescent lamps are preferably threaded and provided with a head suitable for engagement with a wrench or screwdriver. A hexagonal shaped bead suitable for engagement with a standard hexagonal wrench or nut drive is especially useful. Every other ones cavities 96 and 98 may be covered with a filter material, as typified numeral 102. The filter material is appropriatly chosen to provide filtering to prevent interference with night vision imaging systems. Each of the incandescent lamps is appropriately wired to provide electrical power. Alternate ones of the incandescent lamps may be wired to a switch such as 27, such that in one position the filtered lamps are powered and in the other position the unfiltered lamps are powered. Thus, when night vision imaging system is in use, the filtered lamps are used to illuminate LCD's 24 and 26. When the night vision imaging system is not in use, the unfiltered bulbs may likewise be used.

Hinged door 90 permits easy access to lamps 100 from the front of the panel without removing avionics equipment 10 from its panel mounting. To change a lamp that is burned out, screws 92 and 94 are loosened, and hinged door 90 is swung to its open position. A wrench is then used to remove the malfunctioning lamp 100, and a new lamp is similarly inserted. Hinged door 90 is then closed, and screws 92 and 94 are tightened.

The LCD assembly comprised of the components located in FIG. 2 generally between rear assembly 66 and front assembly 68 are contained generally in a concave bezel 110. Bezel 110 is shaped and sized to nest in cutout 22 in frame 20. Bezel 110 comprises an enlarged rectangular concave rear bezel section 112 and a smaller rectangular front bezel section 114. Rear bezel section 112 is sized and shaped to surround and enclose printed wiring board 74 and connect by means of screws or other suitable connectors directly to back panel 70, as indicated by phantom line 116. Front bezel section 114 protrudes from rear bezel section 112 and is sized and shaped to receive a pair of LCD assemblies to be hereinafter described, one above the other. Front bezel section 114 has a pair of frontal rectangular cutouts 118 and 120 such that LCD's 24 and 26 are visible therethrough. One side of front bezel section 114 has a pair of cutouts 122 and 124 laterally aligned with cutouts 118 and 120, respectively. Likewise, the other side of front bezel section 114 has a pair of cutouts 126 and 128 laterally aligned with cutouts 118 and 120. Each of cutouts 122, 124, 126 and 128 is covered with light transmissive panels to be hereinafter described, two of which are illustrated by panels 130 and 132 which cover cutout 122 for example.

One of the LCD assemblies 140 which fits into bezel 110 is shown is fully assembled form. The other generally indicated by the numeral 142 is shown in exploded form and it should be understood that both LCD assemblies 140 and 142 are identical. LCD assembly 142 comprises a U-shaped, channelized backframe 150. The bottom of the channel in U-shaped backframe 150 is provided with a raised luminaire 151 comprised of two planar surfaces rising to a ridge generally centered between the open ends of backframe 150. The sides of backframe 150 are provided with rectangular transverse channels 152 and 154, each having positioned therein an insulated conductor 156 and 158, respectively. Insulated conductors 156 and 158 are preferably elastomeric multi-conductors, comprised of sheets of parallel conductors insulated from each other. A suitable connector of such type is manufactured by PCK Elastomerics of Hatboro, Pa. A portion of conductors 156 and 158 may be used to conduct power to resistive heaters (not shown) in LCD 26 which are needed when LCD's are used in low temperature conditions. Another portion of conductors 156 and 158 may be used to couple thermistors (not shown) in LCD 26 to printed wiring board 74. A thermistor is used to determine the temperature of LCD 26, which is used to determine the current required in the aforementioned resistive heaters to maintain proper LCD operating conditions. Positioned on the sides of backframe 150 and adjacent conductors 156 and 158 in portions thereof are rectangular elastomeric multi-conductors 160 and 162. Elastomeric multi-conductors are similar to elastomeric conductors 156 and 158 and are used to electrically couple contacts 76 and 78 on printed wiring board 74 to edge contacts on LCD 26 (not shown). LCD 26 is electrically coupled to contacts 80 and 82 on printed wiring board 74.

Backframe 150 and elastomeric conductors 160 and 162 are together sized to abut LCD 26. A gasket 170 is provide to abut LCD 26 around the periphery thereof. Gasket 170 provides a seal between LCD 26 and the inside of front bezel section 114 inside cutout 118 when the entire assembly is inserted into bezel 110. LCD 24 is similarly inserted into bezel 110 and sealed against the inside of front bezel section 114.

Figure 3:
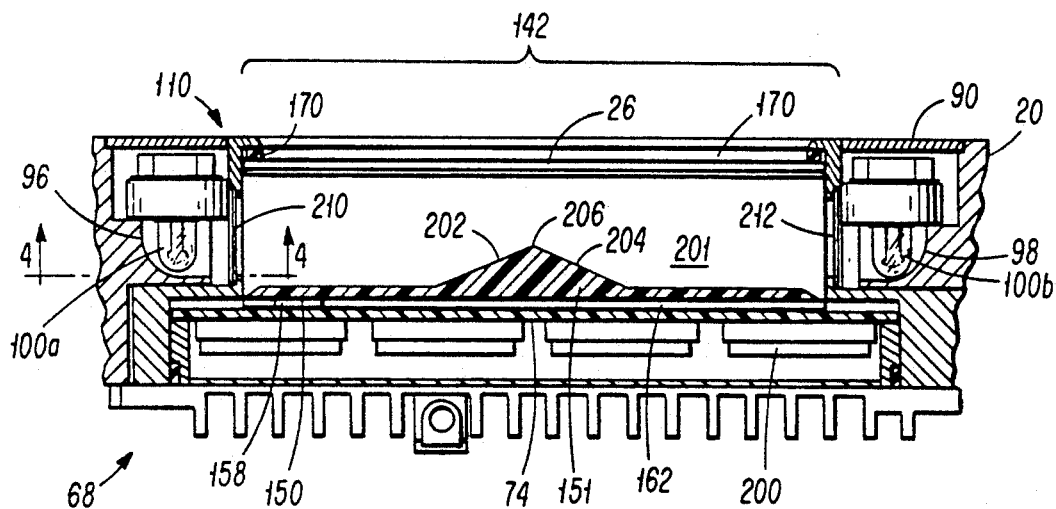
FIG. 3 is a cross-section of the display portion of the avionics equipment of FIG. 1 taken along section line 3—3.

Referring next to FIG. 3, LCD assembly 142 is shown fully nested inside the concavity of bezel 110. Bezel 110 in turn is nested inside the concavity of frame 20 of display front assembly 68. Back panel 70 of display rear assembly 66 abuts the rear of frame 20 and is secured thereto by appropriate fasteners. Printed wiring board 74 is secured to back panel 70 as previously described and has various electronic components on the bottom thereof typified by integrated circuit 200. Printed wiring board 74 is nested inside the concavity of rear bezel section 112 and abuts the bottom of LCD backframe 150. LCD 26 rests atop backframe 150, the edges of which are sealed against the inside front of front bezel section 114 by means of gasket 170. Backframe 150 has a rectangular cross-section with a rectangular channel 201 defined therein. The bottom of channel 201 has a raised luminaire 151 formed thereon comprised of two planar surfaces 202 and 204 rising to a ridge 206 generally centered between the ends of backframe 150. The bottom of backframe 150. including luminaire 151, is coated with a reflective material, preferably a high gloss white enamel paint.

Frame 20 includes generally spherical cavities 96 and 98 into which are nested incandescent lamps 100a and 100b. respectively. As previously noted frame 20 has on each side of LCD assembly 142 a multiplicity of such spherical cavities such as 96 and 98, each holding an incandescent lamp such as 100a and 100b. The inside of spherical cavities 96 and 98 are coated with a reflective material such as high gloss white enamel paint. As previously stated the ends of backframe 150 are open to permit light from incandescent lamps 100a and 100b to pass into cavity 201. At the ends of backframe 150 windows 130/132 of a type to be described hereinafter are inserted to separate cavity 201 from lamp cavities 96 and 98.

Figure 4:
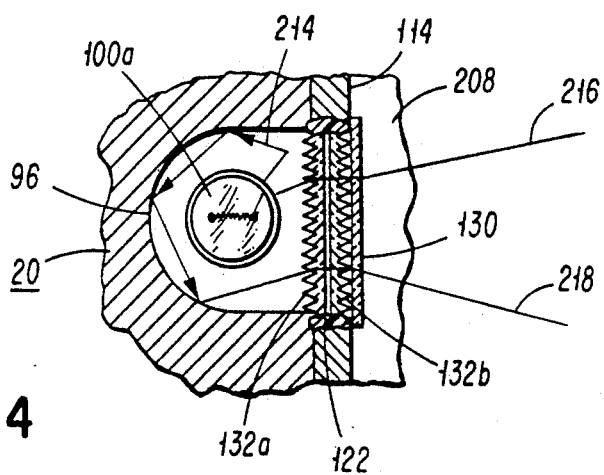
FIG. 4 is a partial cross-section of a lamp cavity and bezel of the display portion of the avionics equipment of FIG. 1 taken along section line 4—4 shown in FIG. 3.

Referring next to FIG. 4, one of the lamp cavities 96 is shown in more detail. Lamp cavity 96 in frame 20 has incandescent lamp 100a centered therein. Lamp cavity 96 is open on the side abutting front bezel section 114 in alignment with cutout 122 and has a generally circular cross-section on the side of lamp opposite backframe 150. More specifically, cavity 96 is shaped like two intersecting cylindrical cavities connected by a spherical radius, much like a cylindrical pipe with an elbow joint. Cutout 122 has sealed therein a window 208 comprised of generally planar sheets 132a and 132b. The window for certain of cavities such as 96 may also include a filter sheet 130 positioned on the outside of window 208 relative to cavity 96. Filter sheet 130 filters light from lamp 100a to remove wavelengths that would interfere with night vision imaging systems as previously discussed.

Each of sheets 132a and 132b are comprised of prism film, such as T.I.R. film manufactured by 3M/Optical Systems of St. Paul, Minn. The prism film comprising sheets 132a and 132b have smooth side and a prismed side, the prismed side of which has a multiplicity of parallel 90 degree grooves cut therein forming a ridged cross-section of adjacent linear prisms. The ridges of the prisms are oriented perpendicular to the surface of LCD 26. The effect of prism film 132a/132b is to reject light rays having an angle of incidence greater than a characteristic threshhold as illustrated by light ray 214 and to transmit light rays with an angle of incidence less than the threshhold as indicated by light ray 216. Transmitted rays are bent in the manner characteristic of prisms. Therefore, in order to maintain an exit angle similar to the entry angle, two sheets of prism film 132a and 132b are positioned side by side with their smooth faces abutting. Other cutouts 124, 126, and 128 are fitted with similar windows. Due to the circular cross-section of lamp cavity 96, rejected light rays such as 214 may reflect around the reflective inner surface of cavity 96 and achieve the proper angle necessary to be transmitted through window 208 as indicated by light ray 218.

The effect of the double prism film comprising window 208 is to distribute light emanating from 100a along the length of LCD backframe cavity 201 in a more concentrated beam. This distributes the light along the length of the back of LCD 26. Otherwise, light would emanate from lamp 100a in a broader beam and would cause bright spots at the edges of LCD 26 nearest lamp 100a. Luminaire 151 (FIG. 3) further assists in uniform light distribution by reflecting from inclined surfaces 202 and 204 and toward the middle of LCD 26 a portion of the light that uselessly impinges upon the rear interior of backframe 150 toward LCD 26. Luminaire 151 is designed such that its ridge 206 projects into backframe cavity 201 approximately one-half the depth of cavity 201. This provides an adequate amount of reflection while permitting light from each lamp to travel the entire width of cavity 201. This permits LCD 26 to remain readable if one of the lateral lamps burns out.

While particular embodiments of the present invention have been shown and described, it should be clear that changes and modifications may be made to such embodiments without departing from the true scope and spirit of the invention. It is intended that the appended claims to cover all such changes and modifications.

I claim:

1. A backlighted flat panel display assembly, comprising:

a frame having a channel having a first end and a second end therein across the extent thereof, said channel being coated with a reflective material;

a flat panel display abutting the frame and positioned over said channel;

a first window of prism film abutting a first end of said frame, coextensive with the first end of said channel;

a second window of prism film abutting a second end of said frame, coextensive with the second end of said channel;

said frame, flat panel display and said first window of prism film and said second window of prism film forming an enclosed unit;

a first light source adjacent the first window of prism film;

a second light source adjacent the second window of prism film;

said first window of prism film and said second window of prism film each comprises two sheets of prism film;

each of said two sheets of prism film for each of said first window of prism film and said second window of prism film has a smooth side and a ridged side and said two sheets of prism film are oriented with their smooth sides abutting; and a sheet of filter material adjacent said two sheets of prism film in each of said first window of prism film and said second window of prism film.

2. A backlighted flat panel display assembly, comprising:

a first frame having a channel therein across the extent thereof and open on at least one end;

a flat panel display positioned over said channel;

a light transmissive window abutting an open end of said first frame, coextensive with the at least one open end of said channel;

a bezel abutting said first frame and having a cutout therethrough;

a recess in a second frame adjacent said cutout and having an opening in registry with the light transmissive window;

a lamp positioned in the recess;

means for driving said flat panel display; and means for powering said lamp.

3. A backlighted flat panel display assembly as described in claim 2 wherein said recess has a threaded bore opening to a front side of said second frame and said lamp has a threaded base to engagement with the threaded bore.

4. A backlighted flat panel display assembly as described in claim 4 further including a door hinged to said second frame and having a cutout coextensive and in registry with said flat panel display and sized to cover said recess.

5. A backlighted flat panel display assembly as described in claim 4 wherein said flat panel display comprises a liquid crystal display.

6. A backlighted flat panel display assembly as described in claim 2 wherein said recess is spherical in shape.

7. A display comprising:
a liquid crystal matrix,
a lamp,
a first prism film having a first prism smooth side and a first prism rough side,
a second prism film having a second prism smooth side and a second prism rough side,
said first prism film and said second prism film being disposed so that said first prism smooth side and said second prism smooth side are adjacent; and
said first prism film and said second prism film being disposed between said liquid crystal matrix and said lamp so that, any light emitted from said lamp passes through said first and second prism films before being incident upon said matrix.

* * * * *